United States Patent

Stutman et al.

[11] Patent Number: 5,954,793
[45] Date of Patent: *Sep. 21, 1999

[54] REMOTE LIMIT-SETTING INFORMATION DISTRIBUTION SYSTEM

[75] Inventors: Peter Steve Stutman, Sudbury; J. Mark Miller, Belmont, both of Mass.

[73] Assignee: Peter S. Stutman, Sudbury, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,224

[22] Filed: Oct. 2, 1996

Related U.S. Application Data

[63] Continuation of application No. 08/028,356, Mar. 9, 1993, abandoned.

[51] Int. Cl.[6] .......................... G06F 13/00; G06F 15/42
[52] U.S. Cl. ........................... 709/204; 600/301
[58] Field of Search .................. 364/224.6; 128/630, 128/670, 672, 677; 395/200.01, 800, 200.3, 800.01; 600/300, 301; 709/203, 204, 217, 227

[56] References Cited

U.S. PATENT DOCUMENTS

| | | | |
|---|---|---|---|
| 4,486,853 | 12/1984 | Parsons | 345/418 |
| 4,674,044 | 6/1987 | Kalmus et al. | 705/37 |
| 4,823,265 | 4/1989 | Nelson | 705/35 |
| 4,868,866 | 9/1989 | Williams | 340/825.31 |
| 4,952,928 | 8/1990 | Carroll et al. | 340/825.54 |
| 4,974,607 | 12/1990 | Miwa | 128/904 |
| 5,003,473 | 3/1991 | Richards | 705/37 |
| 5,007,429 | 4/1991 | Treatch et al. | 128/677 |
| 5,012,411 | 4/1991 | Policastro et al. | 364/413.06 |
| 5,036,852 | 8/1991 | Leishman | 600/301 |
| 5,036,869 | 8/1991 | Inahara | 128/903 |
| 5,086,391 | 2/1992 | Chambers | 340/573.1 |
| 5,199,439 | 4/1993 | Zimmerman et al. | 128/670 |
| 5,307,263 | 4/1994 | Brown | 364/413.09 |
| 5,331,549 | 7/1994 | Crawford, Jr. | 364/413.02 |
| 5,549,113 | 8/1996 | Halleck et al. | 600/484 |

FOREIGN PATENT DOCUMENTS

| | | |
|---|---|---|
| 0505627 | 9/1992 | European Pat. Off. . |
| 4056561 | 2/1992 | Japan . |

OTHER PUBLICATIONS

Article entitled, "Stock Quotes Join Mozart on FM", Information Processing, Business Week, Dec. 13, 1982.

Product Brochure entitled, "The Quote Alert System" by Intelligent Information Incorporated.

Primary Examiner—Meng-Ai T. An
Assistant Examiner—Walter D. Davis, Jr.
Attorney, Agent, or Firm—Cesari and McKenna, LLP

[57] ABSTRACT

A remotely-configurable information distribution system selectively filters inbound information in response to selection and limit parameters provided by a remotely-connected processing device. The selection and limit parameters are assembled as a data packet at the device and the packet is uploaded to the host computer over a limited-bandwidth, communications network. Remote software modules resident in the device facilitate both entry of the parameters by an authorized user and the subsequent transfer of those parameters to the host computer. A communications system of the host computer receives the data packet and transfers the packet to a host-based "filtering" software subsystem, where selected portions of the inbound information are extracted in response to the parameters of the data packet. Upon completion of this latter process, the extracted information is transferred is to the remote processing device over the network in accordance with a non-interactive, asynchronous transfer protocol.

19 Claims, 14 Drawing Sheets

REMOTE LIMIT-SETTING INFORMATION DISTRIBUTION SYSTEM

CROSS REFERENCE TO RELATED APPLICATION

This invention is related to copending U.S. patent application Ser. No. 08/028,333, titled MEDICAL ALERT DISTRIBUTION SYSTEM (now U.S. Pat. No. 5,576,952), and Ser. No. 08/028,351, titled METHOD AND APPARATUS FOR ALERTING MEDICAL PERSONNEL OF EMERGENCY MEDICAL CONDITIONS (now U.S. Pat. No. 5,416,695), each filed Mar. 9, 1993 and each assigned to the assignee of the present invention. This application is a continuation of U.S. application Ser. No. 08/028,356 filed Mar. 9, 1993, abandoned.

FIELD OF THE INVENTION

This invention relates generally to information retrieval and distribution systems and, more specifically, to an information distribution system that is remotely-configurable by subscribers via a communications network.

BACKGROUND OF THE INVENTION

Information retrieval and distribution systems are typically characterized by the efficiency with which they can retrieve, update and distribute vast amounts of information to authorized subscribers in real time. These systems typically utilize data acquisition and distribution techniques that permit each subscriber to access only the type of information for which it is authorized. A typical system includes a host computer having a database for collecting and storing, e.g., security and price information, from a financial/securities information source and subsequently distributing selected portions of that information to authorized users by way of a communications network. The identification of securities selected by subscribers may be entered at the host computer by a computer operator and updates to the acquired information may be periodically transmitted to the subscribers over the network. In addition, numerical values representing high and low limits of the security prices can be entered at the host so that when the price updates match the limits, the subscribers are notified. Changes to the type of information requested or to the frequency of distribution must be effectuated manually at the host and requires operator involvement, thereby increasing the cost and likelihood of erroneous entry.

Other types of known information distribution system provide a uniform wireless broadcast of data to an unlimited number of subscribers. Subscriber access is controlled by transmitted "entitlement messages" which enable the receiving means of the authorized subscribers to receive and process the broadcast data. Entitlement messages are used to provide subscribers with selected portions of data by enabling or disabling the subscriber's receiving apparatus.

Still other types of systems provide a continuously transmitted stream of encoded data messages to its subscribers. A keyword card permits a receiver and associated displaying apparatus to access the transmitted stream of data and select those of interest to be stored and displayed. Those data messages which are not of interest to the subscriber are discarded.

Each of these latter distribution systems suffers from the disadvantage that the data must be continually broadcast to all of the subscribers, resulting in the consumption of significant transmission bandwidth. Moreover, the selection, i.e., extraction, of broadcast information at each receiving unit is a significant factor in the expense of the unit, requiring expensive hardware and software components to power and outfit the unit, and to allow management of the information by the receiving unit.

SUMMARY OF THE INVENTION

The invention resides in a remotely-configurable information distribution system for selectively filtering inbound information at a host computer in response to selection and limit parameters provided by a remote processing device or "subscriber". The selection and limit parameters are assembled as a data packet at the subscriber unit and the entire packet is uploaded to the host computer over a limited-bandwidth, communications network, thereby obviating the need for a continuous, interactive exchange with the host during the selection and limit entry process.

Remote software modules resident in the subscriber unit facilitate both entry of the parameters by the authorized user and the subsequent transfer of those parameters to the host computer. These software modules embody a plurality of independent processes, each of which performs specific operations. Specifically, a user interface process allows entry and modification of the parameters in a user-recognizable format. A message-forming process then assembles the parameters into a data packet, which is uploaded to the host computer over the communications network in accordance with an asynchronous transfer protocol. In an exemplary embodiment of the invention, the communications network comprises a wireless, limited-bandwidth communications channel. This latter arrangement obviates the need for a continuous, interactive exchange with the host during the selection-and-limit entry process.

A communications system of the host computer receives the data packet from the subscriber and the inbound information from transmission feeds of various sources, and controls the transfer of the packets and information to a host-based "filtering" software subsystem. Software modules resident in this latter subsystem are organized to interface with software modules resident in a database subsystem to extract selected portions of the received information in response to the parameters of the data packet. These software modules also embody a plurality of independent processes, each of which performs specific operations.

In an exemplary embodiment, a DATABASE process maintains a primary database of information records received from the suppliers and transfers the contents of the records to other processes upon request. Each database record includes an IN_ALERT flag which, when asserted, directs the DATABASE process to transfer the contents of the records to an ALERT process. The ALERT process maintains its own database of "alert records". Each alert record includes a selection parameter and "initial" and "incremental" limit parameters as provided by the subscribers. When the contents of a record are received in response to an asserted IN_ALERT flag, the ALERT process compares the received contents with the initial limits of its database records and if a match occurs, the information is extracted and transferred to the subscriber. The extracted information, together with a notification of the condition, is transferred to the subscriber unit over the network in accordance with a non-interactive, asynchronous transfer protocol. The initial limit parameter is then updated with the incremental limit by the ALERT process. This updated parameter is compared with the contents of records subsequently received by the ALERT process and the subscriber is again notified of a satisfied limit condition.

One advantage provided by this arrangement involves remote control of the type of information extracted at the host computer. That is, the inbound information feeds, which may be either high-speed streams of data or data packets transmitted either directly to the host computer or to an intervening database subsystem, are manipulated at the host computer in accordance with the selection and limit parameters provided by remote subscribers. Each authorized remote subscriber can adjust the parameters of the host computer so as to receive only limit conditions, i.e., data which meets its filter parameter specifications, on an as-needed basis. This arrangement significantly conserves bandwidth, while allowing use of less expensive, yet reliable, means of data transmission.

Another advantage is that adjustment of the parameters can be performed at the subscriber unit prior to communication with the host computer. While this arrangement conserves bandwidth as described below, it also enables verification of the parameters entered at the remote site prior to network connection with the host computer.

Yet another advantage of the invention is that the user may enter the parameters into the subscriber device in a user-recognizable format, where they may be transmitted to the host computer by, for example, simply depressing a key. The remote software residing on the subscriber provides binary code translations and data transfer protocols that are transparent to the user, thereby obviating user knowledge of the distributed data processing architecture. Moreover, the data transfer is non-interactive, i.e., transfer of the parameters to the host computer is provided only upon demand of the user without the need for a conversational mode of communication. This latter feature increases the utilization of the network by reducing the required bandwidth, thereby enabling use of a cost-effective, limited-bandwidth communications channel.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
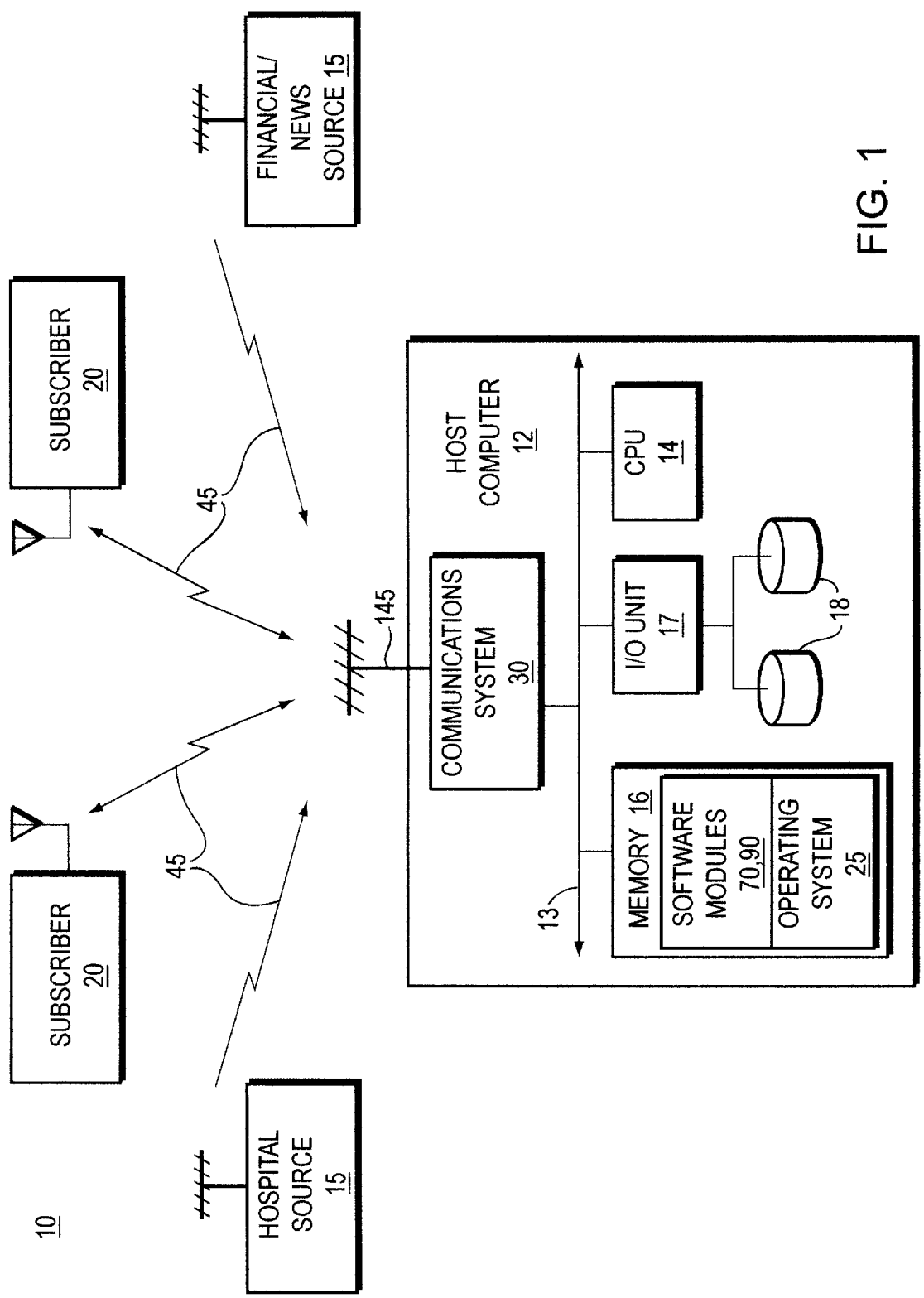
FIG. 1 is a diagram of a remotely-configurable information distribution system comprising a plurality of information sources and subscriber units coupled to a host computer.

FIG. 1 depicts an information distribution system 10 that includes a host computer 12 connected to a plurality of sources 15 and subscriber units 20. The host computer 12 is preferably configured to perform functions that typically involve frequent accesses to secondary storage media and, for the exemplary embodiment described herein, incorporates a database for storing inbound information received from the sources 15. However, in an alternate embodiment of the invention, the database may reside on another machine that is coupled to the host 12. Financial/news service agencies and medical repositories, such as hospital databases, supply the inbound information. The subscriber units 20 are typically processing devices such as intelligent terminals and portable computers. The subscribers and sources are coupled to a communications system 30 of the host via a network 45 which may include wireless radio communication or wireline (telephone line) connections.

The host computer 12 includes a central processing unit (CPU 14), an I/O unit 17 and associated storage devices 18, such as magnetic disks and tape drives, a main memory 16 and the communications system 30 interconnected by a system bus 13. An operating system 25, portions of which are typically resident in main memory 16 and executed by the CPU 14, functionally organizes the computer. The operating system 25 also includes, inter alia, software modules 110 (FIG. 3) executed by the communications system 30 to control the transfer of information to the other components of the computer 12. These modules are, in turn, responsible for invoking operations in support of application programs executing in the computer.

For the exemplary embodiment disclosed herein, the application programs pertain to real-time data acquisition and transactional processing. Such applications require fast data access to and from storage devices 18 that are shared among the subscribers 20 and sources 15. Instances of the software modules and application programs executing in the computer are called "processes". A process is an individually scheduable entity consisting of code and data, and characterized by dynamic states, as described below. The operating system 25 organizes the host computer 12 by tracking, suspending and resuming execution of the processes, while allocating to them the CPU 14 and other system resources.

The hardware and software components of the host computer 12 arrange related data items, i.e., records, into files and then organize the files in a manner that facilitates efficient and accurate inquiry and update. Specifically, host-based software modules 70, 90 resident in the memory 16 operate to selectively extract, i.e., "filter", the contents of the files in response to selection and limit parameters remotely provided by the subscribers 20, thereby enabling efficient performance of the data acquisition and transactional processing operations that characterize the computer.

Figure 2:
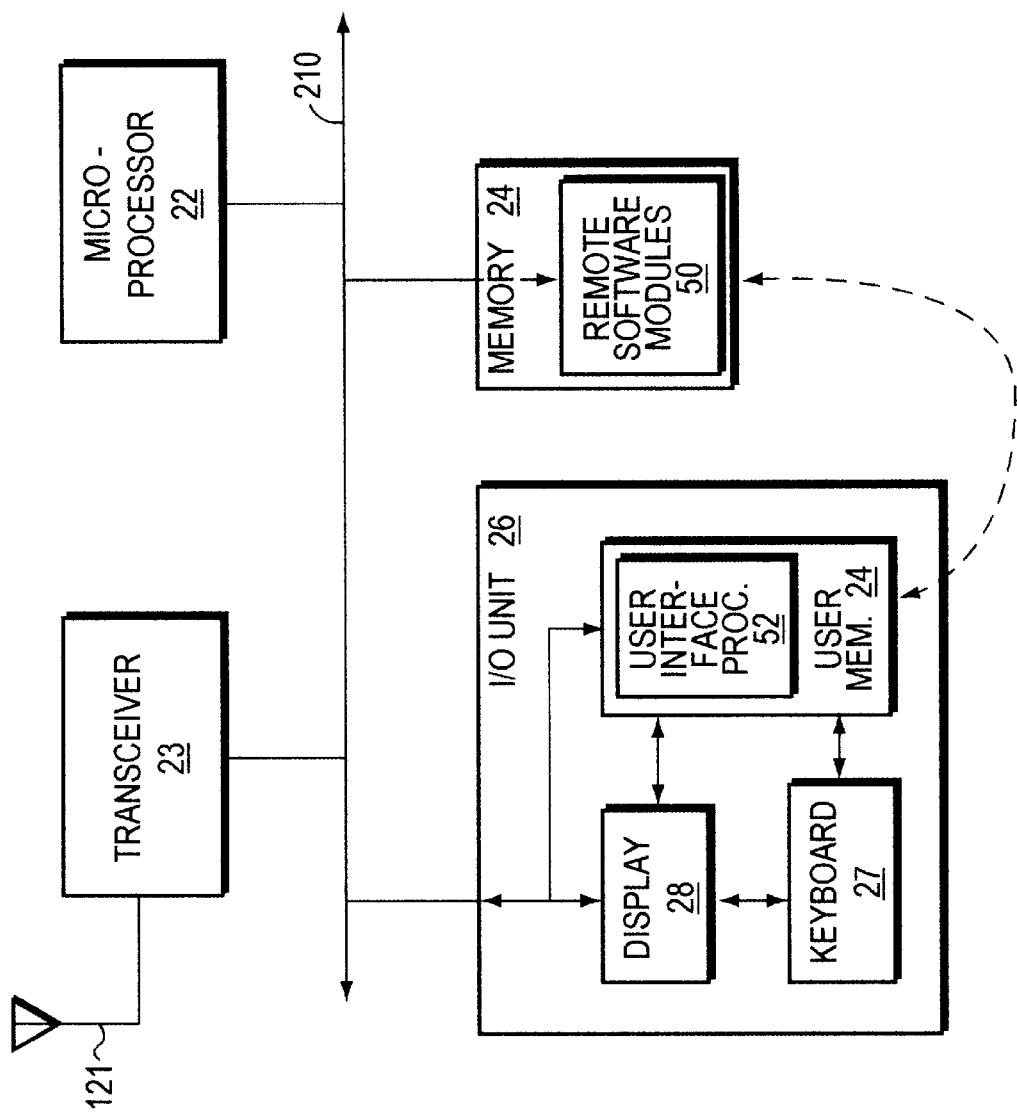
FIG. 2 is a block diagram of a subscriber unit.

The subscriber unit 20 comprises a microprocessor 22, a memory 24 and an I/O unit 26 interconnected by a bus 210, as shown in FIG. 2. Buffering of selection and limit parameters in the memory 24 and subsequent transfer of these parameters to the host computer 12 are controlled by the microprocessor 22. Remote software modules 50, typically resident in the memory 24, facilitate interpretation and organization of the selection and limit parameters entered by an authorized user.

As described further herein, a user interface process 52 of the remote software modules 50 presents a series of menus on a flat screen display 28 and provides for manipulation by a keyboard 27. The menus allow a user to enter the selection and limit parameters in a user-recognizable format, where translations are performed locally by the microprocessor 22 during execution of the software modules 50 prior to arranging the parameters in a message or "data packet" format. The microprocessor 22 then transfers the data packet to a transceiver unit 23 and the packet is transmitted over the network 45 to the host computer 12. For upload transmission of the packet to the host over a wireline medium, the transceiver unit 23 preferably comprises a wireline modem circuit configured to transmit the packet in accordance with conventional packet transfer protocols.

Figure 3:
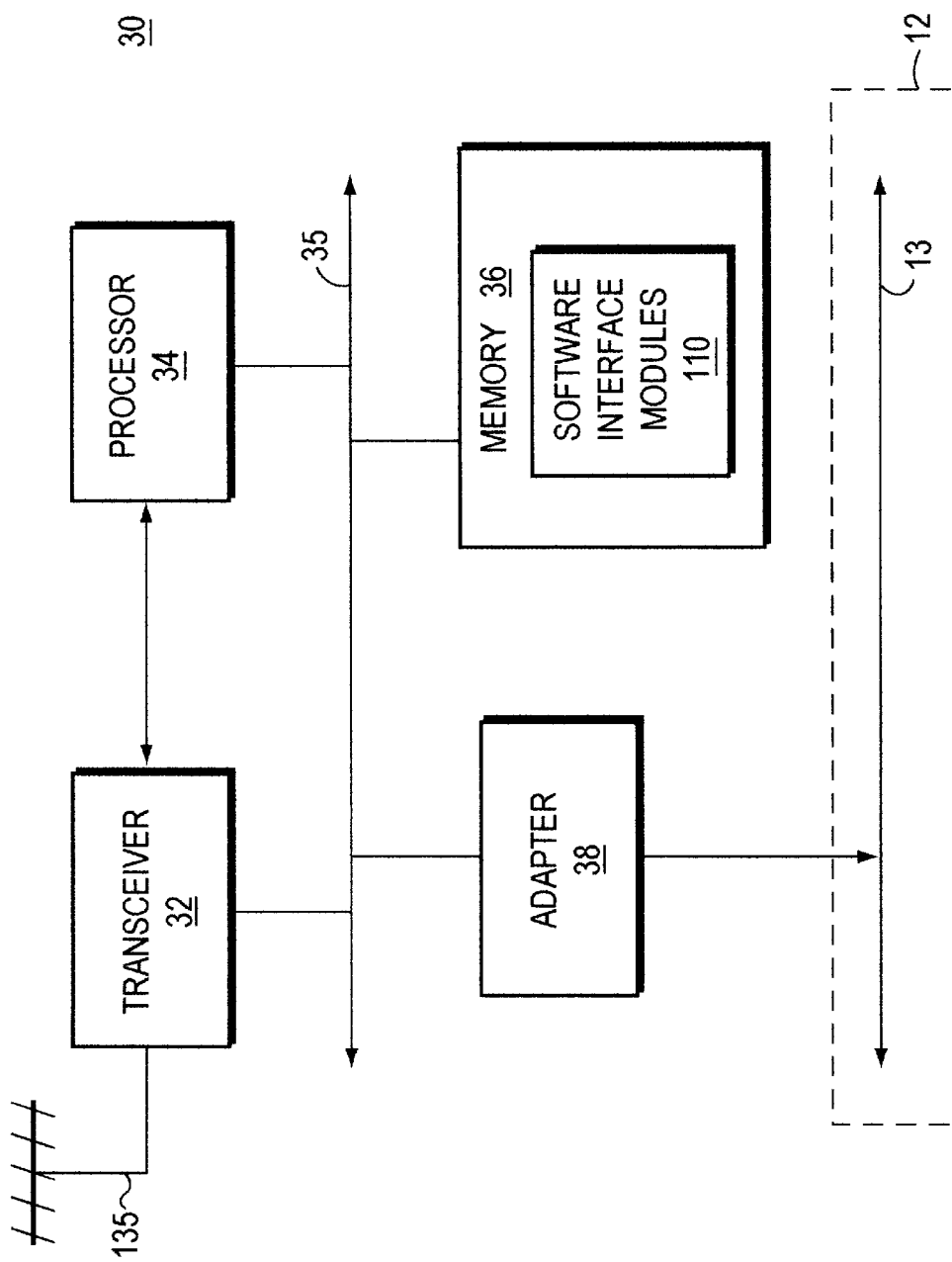
FIG. 3 is a block diagram of a communications system of the host computer.

The communications system 30, shown in FIG. 3, provides a receiver/transmitter interface to the host computer 12. Accordingly, the communications system 30 includes a transceiver unit 32, a processor unit 34 and a memory unit 36 interconnected by a "front-end" bus 35. As noted, the processes of the software modules 110 are typically resident in the memory unit 36 and executed by the processor unit 34 to control the transfer of information between the communications system 30 and the other components of the computer. The transceiver 32 receives information from the sources 15 and transfers the information to the processor 34 for decoding in connection with known decoding algorithms. There, the information is converted to a message format for transfer to the memory 16 through an adapter 38 coupling the front-end bus 35 to the system bus 13 of the host computer 12. The transceiver 32 also receives data packets from the subscribers 20 and forwards them to the processor 34 as described above; in addition, the transceiver may transmit messages to conventional paging services for distribution to the subscribers 20.

Communication to the subscribers 20 from the host computer 12 is effected by equipping each subscriber with a receiver, included within the respective transceiver units, that is capable of receiving messages from the host's transmitter, which is included within the transceiver unit 32. The receiver may be a conventional FM radio receiver circuit adapted for non-interactive, limited-bandwidth, wireless network communication, e.g., paging speeds of 1.2K bps, with a conventional FM radio transmitter at the host, although other receiver and transmitter arrangements, such as wireless modems, may be used. It is also understood that wide-bandwidth channels may be utilized; however, the method and apparatus described herein reduces the amount of bandwidth needed to accomplish the functions provided by the invention. In accordance with the exemplary embodiment of the invention, each subscriber has a radio receiver circuit for receiving paging information from the host 12 and a wireline modem transmitter circuit for transmitting packets of parameter data to the host over wireline media.

Figure 4:
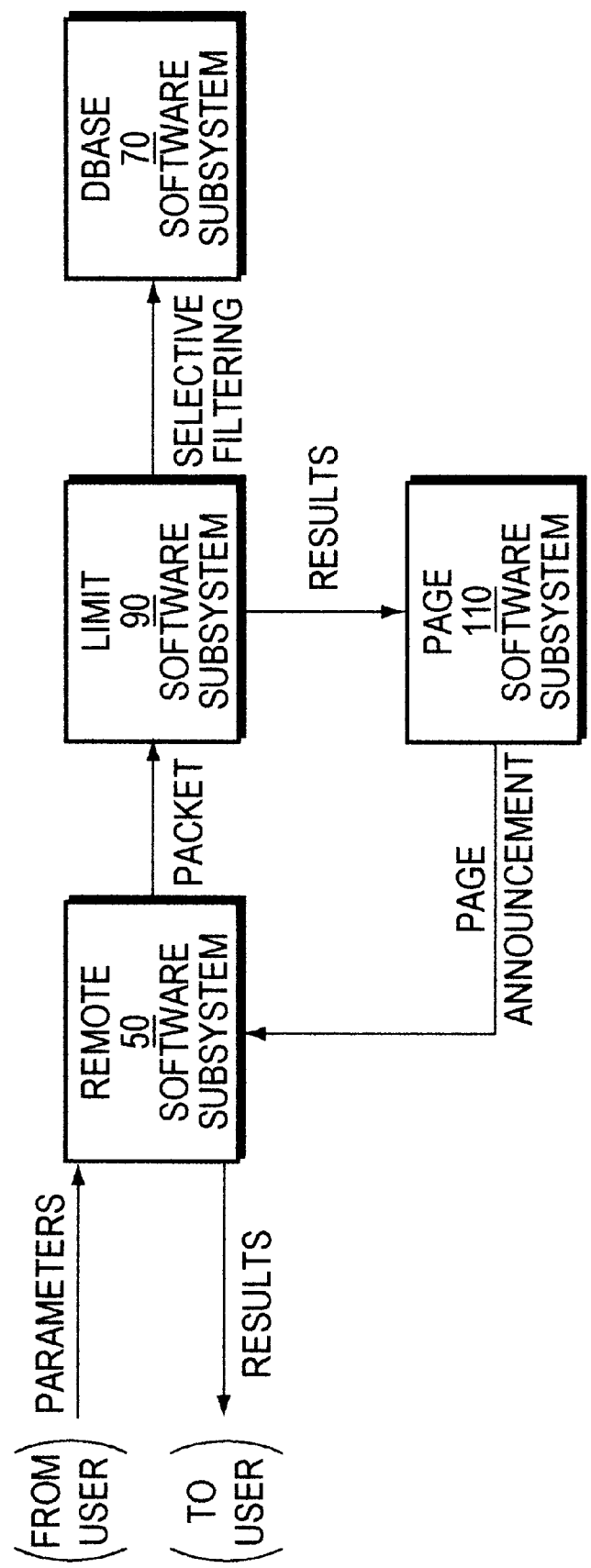
FIG. 4 is a flow diagram of the interaction between a REMOTE software section of the subscriber device, and LIMIT, DBASE and PAGE software sections of a software system of the host computer in accordance with the invention.

One objective of the system according to the invention is to provide fast and efficient access to the information files provided by the sources 15. Another objective is to provide selective filtering of the information in response to selection and associated limit parameters provided by the subscribers 20. To achieve these objectives, the software modules of the subscriber 20 and the host computer 12 are organized as a software system 40 comprising four (4) software subsystems: the remote (REMOTE 50) subsystem, the host (LIMIT 90) subsystem, the database (DBASE 70) subsystem and the transmission (PAGE 110) subsystem. A flow diagram of the interaction between these portions of the software system 40 is illustrated in FIG. 4.

In general, the REMOTE 50 software allows a user to accurately and efficiently enter selection and limit parameters at the subscriber device 20. Further, the REMOTE 50 software organizes the parameters into a data packet format and controls the transfer of the packet to the LIMIT 90 software subsystem over the communications network. The LIMIT 90 software interfaces to the DBASE 70 software subsystem to perform selective filtering of the database information in response to the parameters of the packet. The results of the selective filtering process are then communicated back to the REMOTE 50 software by the PAGE 110 software subsystem, preferably by paging transmission. It should be noted that the DBASE 70 software architecture could be different from that of the LIMIT 90 software; only the interface between these processes need be defined. As described below in connection with FIGS. 10A and 10B, this interface consists of the exchange of messages between the processes.

Each of these subsystems comprise a plurality of independent processes for performing specific operations. Because some of these operations require more time to complete than others, the arrangement of independent processes allows various operations to execute in parallel or to execute on other machines. The processes functionally interconnect through logical path sockets, i.e., virtual circuit connections, which, for the illustrative embodiment described herein, are TCP/IP sockets.

Figure 5:
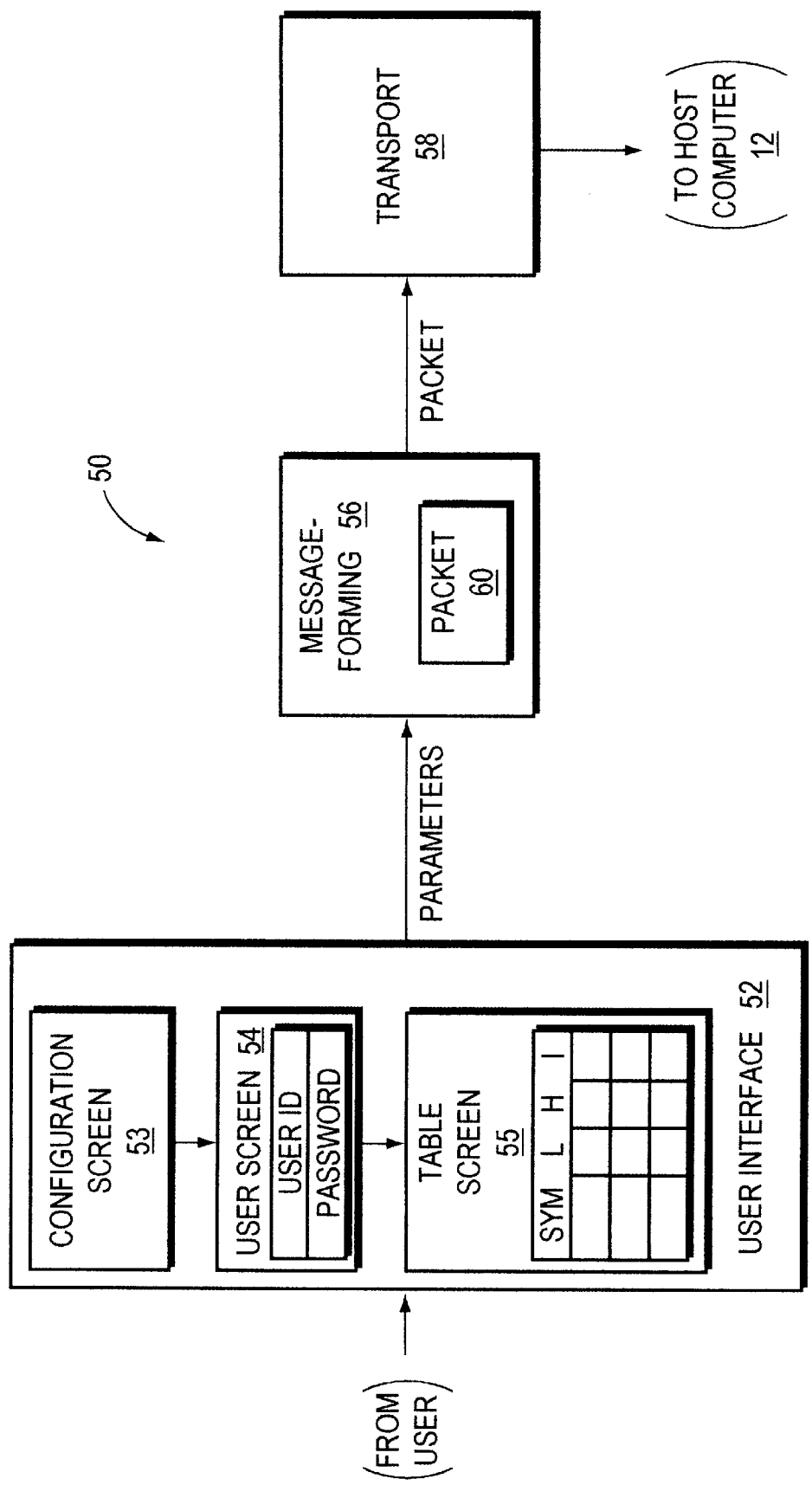
FIG. 5 is a block diagram of the processes constituting the REMOTE software section of FIG. 4.

FIG. 5 illustrates the processes constituting the REMOTE 50 software subsystem. The USER INTERFACE 52 process facilitates configuration of the subscriber device 20 and entry of the limit parameters by providing speech recognition and voice response interface capabilities to an authorized user; however, for the exemplary embodiment set forth herein, the USER INTERFACE 52 provides a series of menus on the display 28 (FIG. 2). Initially, a configuration screen 53 enables selection of a communications port, e.g., a serial port, and inquires about the type of modem connected to that port. A user screen 54 then prompts the authorized user to enter a user identification (ID) and a password. Typically, the user ID comprises a 20-character alpha-numeric string, while the password is an 8-character string. The password provides a measure of security by enabling validation of the user.

A table screen 55 provides a template for entering the selection is and limit parameters. The selection parameter is typically a symbol (SYM) specifying, for example, a particular stock on a particular exchange. A dictionary of symbols feature of the interface process allows a user to identify appropriate symbol acronyms and abbreviations. The limit parameters, which are typically numeric characters, include a low (L) or "initial" limit value, a high (H) limit value and an incremental (I) limit value. The USER INTERFACE 52 process validates the format of these parameters but does not interpret them. In the exemplary embodiment of the invention, the incremental limit is used to increment both the initial and high limits by the specified value when either of those latter limits are met, thereby maintaining a limit "window"; accordingly, the limit parameters function as "adaptive" limits. In an alternate embodiment, the incremental limit may specify the relation in degree or number between two similar things, e.g., the rate of change of the stock price from a previous (initial limit) close. Here, the high limit is not needed. Use of the incremental limit as a ratio of change is particularly advantageous in medical information applications, as described further below.

Figure 6:
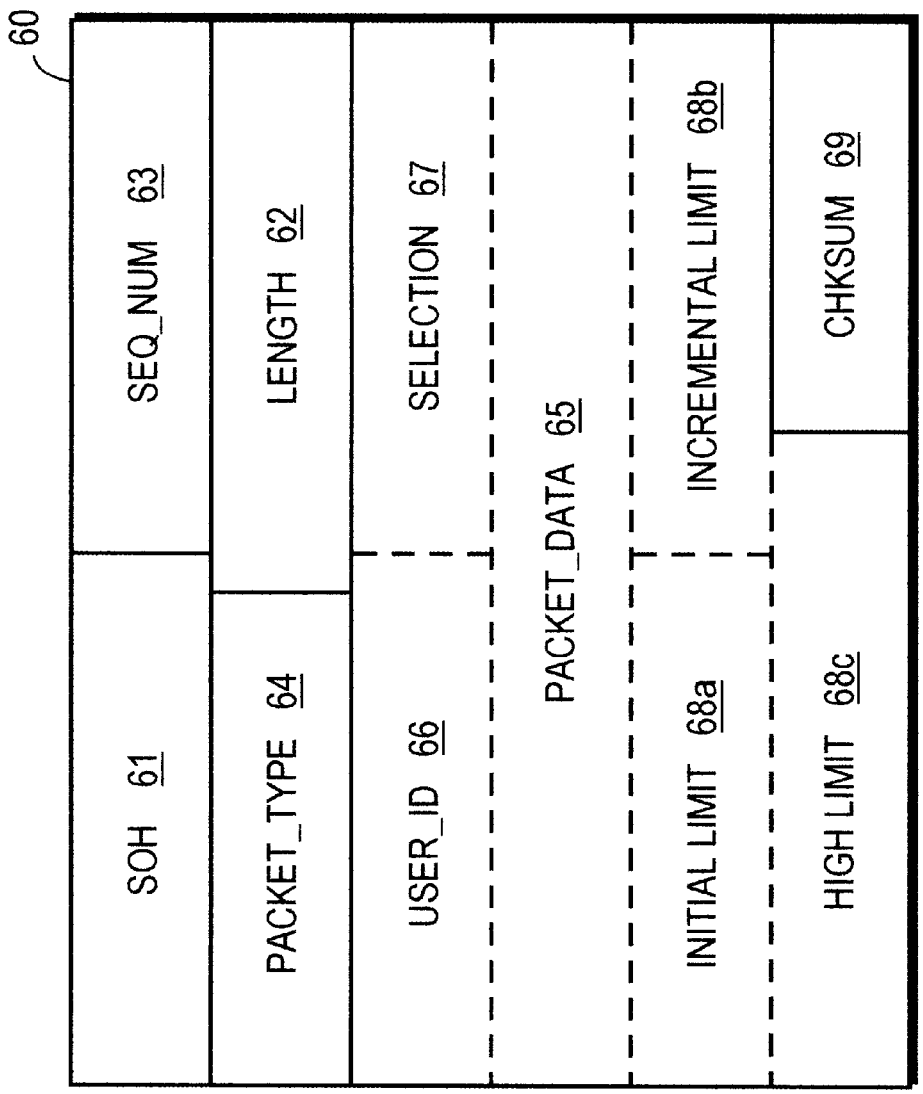
FIG. 6 is a diagram of the format of a data packet used to transfer parameters from a subscriber to the host computer.

A MESSAGE-FORMING 56 process assembles the parameters into a data packet 60 for transfer to the host computer 12. The format 60 of a typical data packet is depicted in FIG. 6. An eight-bit "start-of-header" SOH field 61 identifies the beginning of the packet and a 16-bit LENGTH field 62 identifies the amount of data in the packet. The field SEQ_NUM 63 is an eight-bit packet identification value and the PACKET_TYPE field 64 identifies whether the packet includes command and data parameters or control-type information.

The PACKET_DATA field 65 may be as large as two hundred and fifty-five bytes and consists of subfields that include a user identification USER_ID subfield 66, a selection parameter SELECTION field 67 and limit parameter LIMIT fields 68a–c. Preferably, the SELECTION field 67 contains symbol data and the LIMIT fields 68a–c contain numerical data. Lastly, an eight-bit checksum CHKSUM field 69 consisting of an algebraic sum of transmitted characters is included within the packet for reliability purposes.

Referring again to FIG. 5, the packet 60 is uploaded to the host computer 12 over the communications network 45 in accordance with a conventional asynchronous transfer protocol implemented by the TRANSPORT 58 process. This process initiates a connection to the host, preferably using a conventional wireline modem circuit, thereby obviating the need for a continuous, interactive exchange with the host during the selection and limit entry process.

Figure 7:
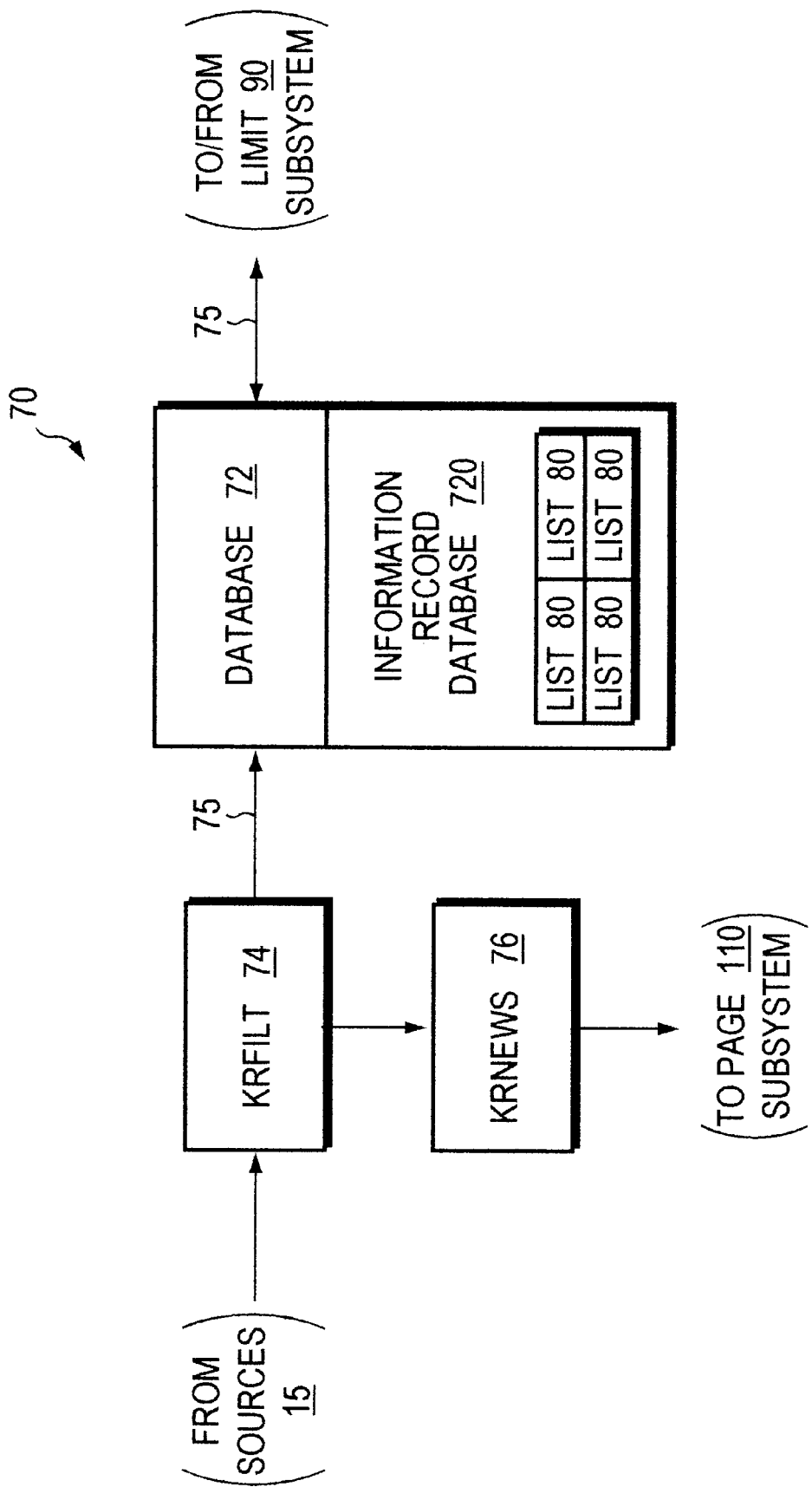
FIG. 7 is a diagram of the processes constituting the DBASE section of FIG. 4.

FIG. 7 depicts the processes constituting the DBASE 70 subsystem. The main DATABASE 72 process is responsible for initializing the KRFILT 74 process of this subsystem and ensuring that it remains active. Because the DBASE 70 software is embodied within the host computer 12 for the exemplary embodiment described herein, DATABASE 52 also initializes the ALERT and BROADCAST processes of the LIMIT 90 subsystem. DATABASE 72 also administers an information record database 720 of information received from the sources 15. Examples of the administration functions performed by DATABASE 72 include modification of the contents of the information records and transfer of the record contents to other processes upon request. Requests for selected records are effectuated by exchanging messages through direct socket connections 75 with the DATABASE 72 process.

To facilitate the exchange of messages, the processes perform read and write operations to storage locations in memory that are organized to provide data structures, e.g., linked lists. It is to be understood that the CPU 14 performs the actual read, write and booleon operations on behalf of the processes resident in the host memory 16, whereas the communications system 30 incorporates the necessary "intelligence" to perform similar operations on behalf of the processes resident in its memory 36.

Figure 8:
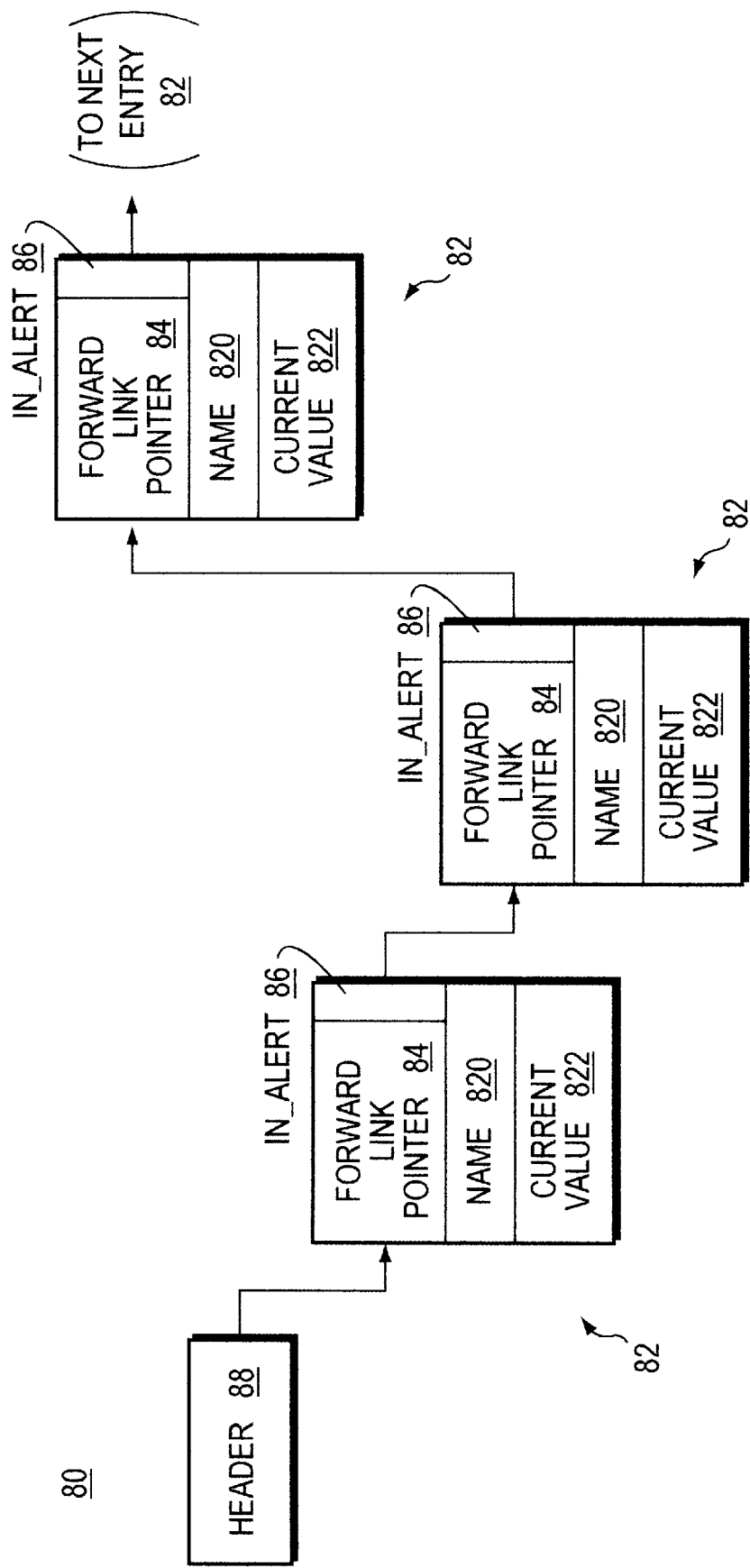
FIG. 8 is a diagram of a linked list data structure including entries for storing information records.

FIG. 8 illustrates a typical linked list 80 that includes entries 82 for storing database records. A header 88 contains an address that points to first entry in the list 80. Each entry 82 contains a forward link pointer 84 referencing the memory location of the next entry in the list; therefore, the entries 82 do not have to occupy consecutive locations in memory and additional entries can be dynamically allocated by the operating system 25. Rather than allocating a separate block of memory locations for each entry, the operating system 25 apportions a block into one hundred (100) entries. The blocks may then be swapped in and out of memory at the appropriate time; in the illustrative embodiment, swapping is performed in accordance with standard UNIX System 5 (page) swapping techniques.

Each record entry 82 also contains, inter alia, a record name (symbol) field 820, a current value field 822 and an IN_ALERT flag 86. The IN_ALERT flag 86 is preferably a 1-bit flag that is constantly checked by the DATABASE 72 process to initiate selective filtering of the database information. When asserted, the flag 86 directs the DATABASE 72 process to write the contents of the record entry 82 as an ALERT_LIMIT message to an ALERT process of the LIMIT 90 subsystem.

Figure 9:
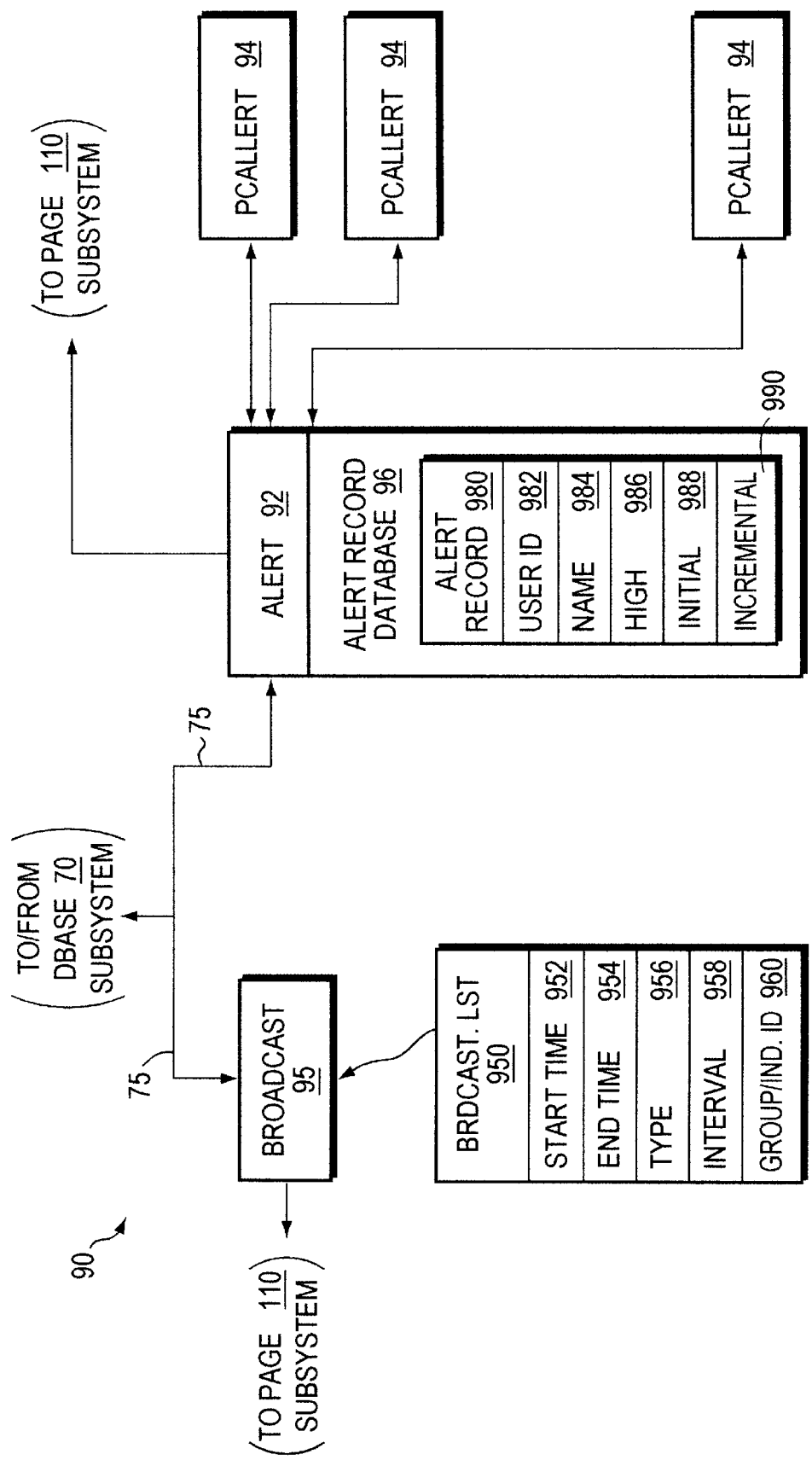
FIG. 9 is a diagram of the processes constituting the LIMIT section of FIG. 4.

FIG. 9 depicts the processes constituting the LIMIT 90 subsystem. The ALERT 92 process is the entity that manages the selection and limit parameters received by the PCALERT 94 processes. The ALERT 92 process maintains its own database 96 of "alert records" 980 which include the parameters provided by the subscribers 20. Specifically, each alert record 980 contains the user ID 982 of the subscriber, the name (symbol) 984 of the selected record, and the high limit 986, initial limit 988 and incremental limit 990 desired for that record.

When an ALERT_LIMIT message is received from the DATABASE 72 process, ALERT 92 parses the contents of the message and compares the record name field 820 of the message to the name field 984 of the alert record 980. If a match ensues, the parsed current value field 822 of the message is compared to the limits of the matching s alert record. If a limit is met, ALERT 92 then sends a page, including the message as described below, to the PAGE 110 subsystem for transmission to the subscriber 20.

The PCALERT 94 process provides an interface between the data packets received from the subscribers 20 and transferred to the ALERT 92 process. PCALERT 94 is preferably distinct from the ALERT process so that the former process can assume responsibility for modem handling operations required to establish simultaneous connections with subscribers. PCALERT 94 hibernates in a suspended state until prompted by receipt of a packet that either inquires about certain information or requests changes to selection and limit parameters. PCALERT 94 then transitions to a running state and validates the user ID 36 of the packet. Upon validation, the process forwards the packet to the ALERT 92 process.

If the packet involves an inquiry of current limits, the ALERT 92 process obtains the appropriate record from its database 96 and forwards the information back to the PCALERT 94 process. There, the information is transmitted to the subscriber via the modem. If the packet includes selection and limit parameters, the ALERT 92 process converts the packet to a message format for transfer to the DATABASE 72 process.

Figure 10A:
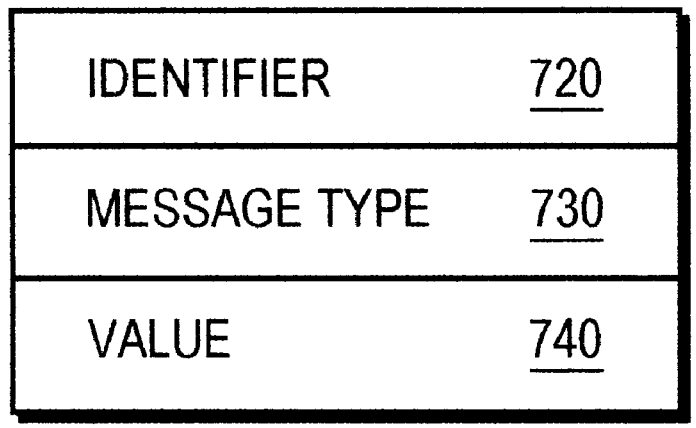
FIGS. 10A and 10B depict the formats of typical messages used for communication among the processes of the system.

As noted, the processes communicate by exchanging messages through socket connections. In accordance with the invention, there are basically two types of messages used in the system: a DB_MSG and a DB_REQUEST. DB_MSG is a 1-way message in the sense that it only directs the receiving process to perform some function. FIG. 10A depicts the format 700 of a typical DB_MSG. The identifier field 720 indicates the symbol (name) of the record. The message type field 730 identifies the action to be taken, such as asserting a flag, and the value field 740 specifies the particular flag, e.g., the IN_ALERT flag 66.

Figure 10B:
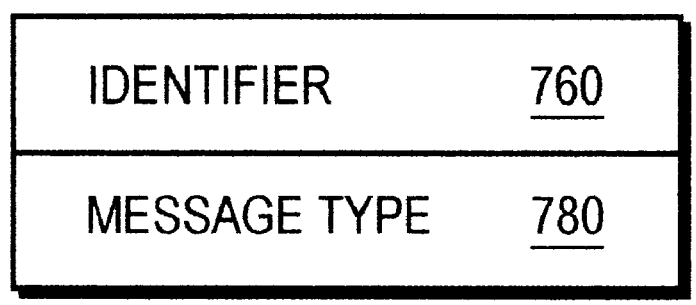

On the other hand, a DB_REQUEST is a request by a process for information; therefore, the process receiving the request is expected to reply. FIG. 10B shows the format 750 of a typical DB_REQUEST, including the identifier field 760 for identifying the name of the record and the message type field 780 for identifying the request, such as the current value of that record entry.

Referring again to FIG. 9, the BROADCAST 95 process manages the type and frequency of announcements that are transmitted for general reception by the subscribers. A brdcast.lst file 950 is created at system initialization and contains a list of group/individual ID records together with broadcast information associated with each record. Specifically, the broadcast information includes the starting time 952 and ending time 954 for broadcasting, the type 956 of announcement to be broadcast, the intervals 958 at which the announcements are broadcast and the group/individuals 960 receiving the broadcast. In some cases, the group ID specifies a class of subscribers for receiving a broadcast.

When a broadcast is scheduled to take place, the BROADCAST 95 process sends a DB_REQUEST 750 to the DATABASE 72 process requesting the contents of a particular record. The information is then forwarded to BROADCAST 95 in a BRDCAST_DATA message. It should be noted that the BRDCAST_DATA and ALERT_LIMIT messages are facsimiles of the record entries 82. Upon receipt of the BRDCAST_DATA message, BROADCAST 95 formats an announcement, establishes a socket connection to the PAGE 110 subsystem and forwards the announcement for broadcast transmission to the subscribers. The BROADCAST 95 process then enters a suspended state and, at the appropriate time, resumes execution.

The KRFILT 74 process, shown in FIG. 7, provides an interface between the sources' information and the database subsystem. Specifically, the interface process decodes and converts the received information to DB_MSGs 700 for transfer to the DATABASE 72 process. The KRFILT 74 process also examines the contents of the information feed and, if the examination indicates an appropriate "newsworthy" topic, extracts that information for transfer to the KRNEWS 76 process. This latter process identifies which subscribers, if any, should receive the information, establishes a socket connection to the PAGE 110 subsystem and forwards the information as a page or announcement to that subsystem.

Figure 11:
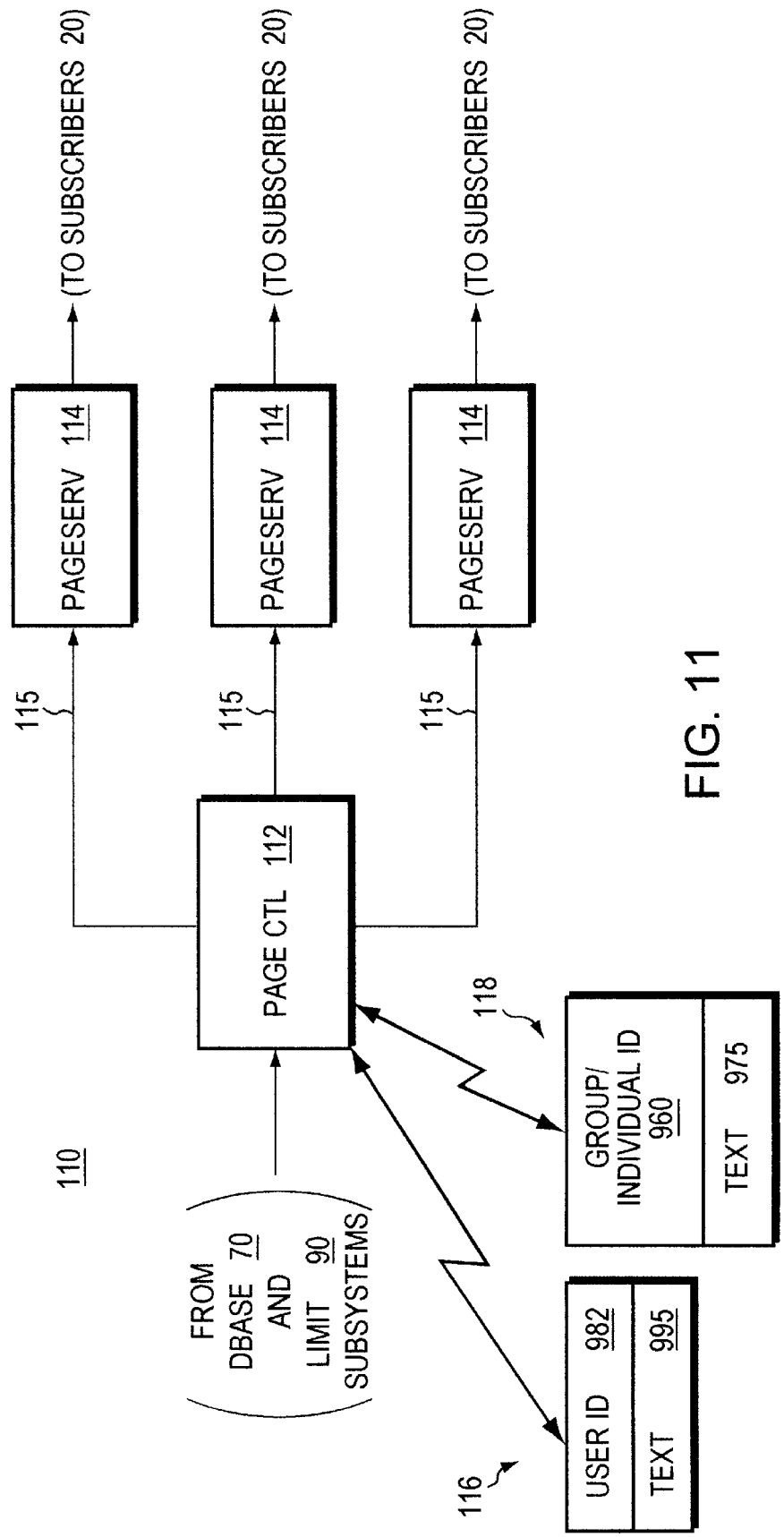
FIG. 11 is a diagram of the processes constituting the PAGE section of FIG. 4.

FIG. 11 depicts the processes constituting the PAGE 110 subsystem. The PAGECTL 112 process manages the interface between the LIMIT 90 and DBASE 70 software, and various known paging services used for distributing messages to the subscribers 20. Specifically, PAGECTL 112 receives pages 116 and announcements 118 from the software processes of the system, and forwards them to available PAGESERV 114 processes. A page 116 includes the ID 982 of a user and a text string message 995, and an announcement 118 includes a group/individual ID 960 and a text string message 975. The PAGESERV 114 processes operate with the remote paging services by establishing connections with the services. Each PAGESERV 114 process collects the pages 116 and announcements 118 in a queue (not shown) and then transfers them to the paging service for transmission.

Figure 12A:
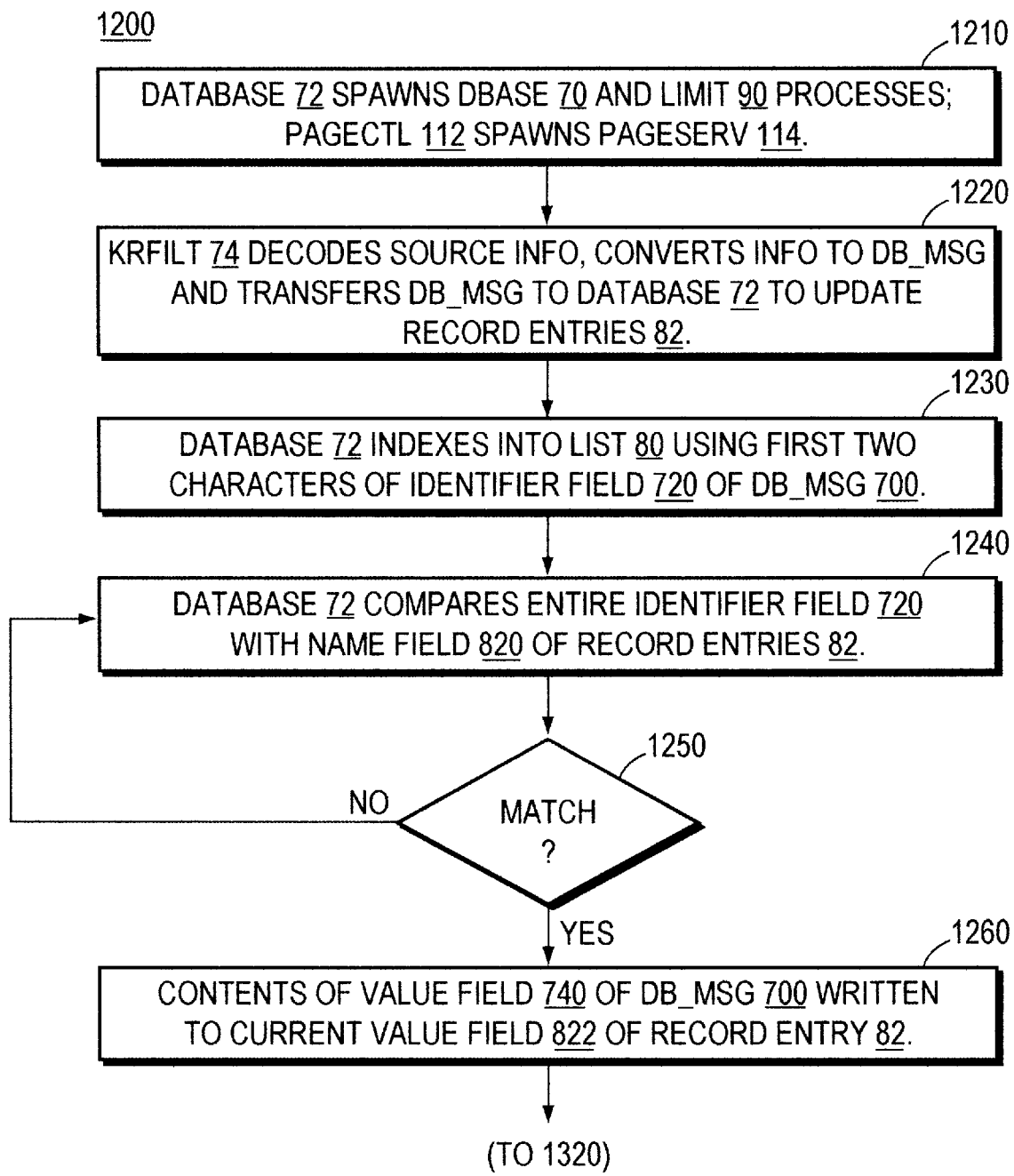
FIGS. 12A, 12B and 12C are flowcharts detailing the sequence for remotely configuring the information distribution system of FIG. 1 in accordance with the invention.
Figure 12B:
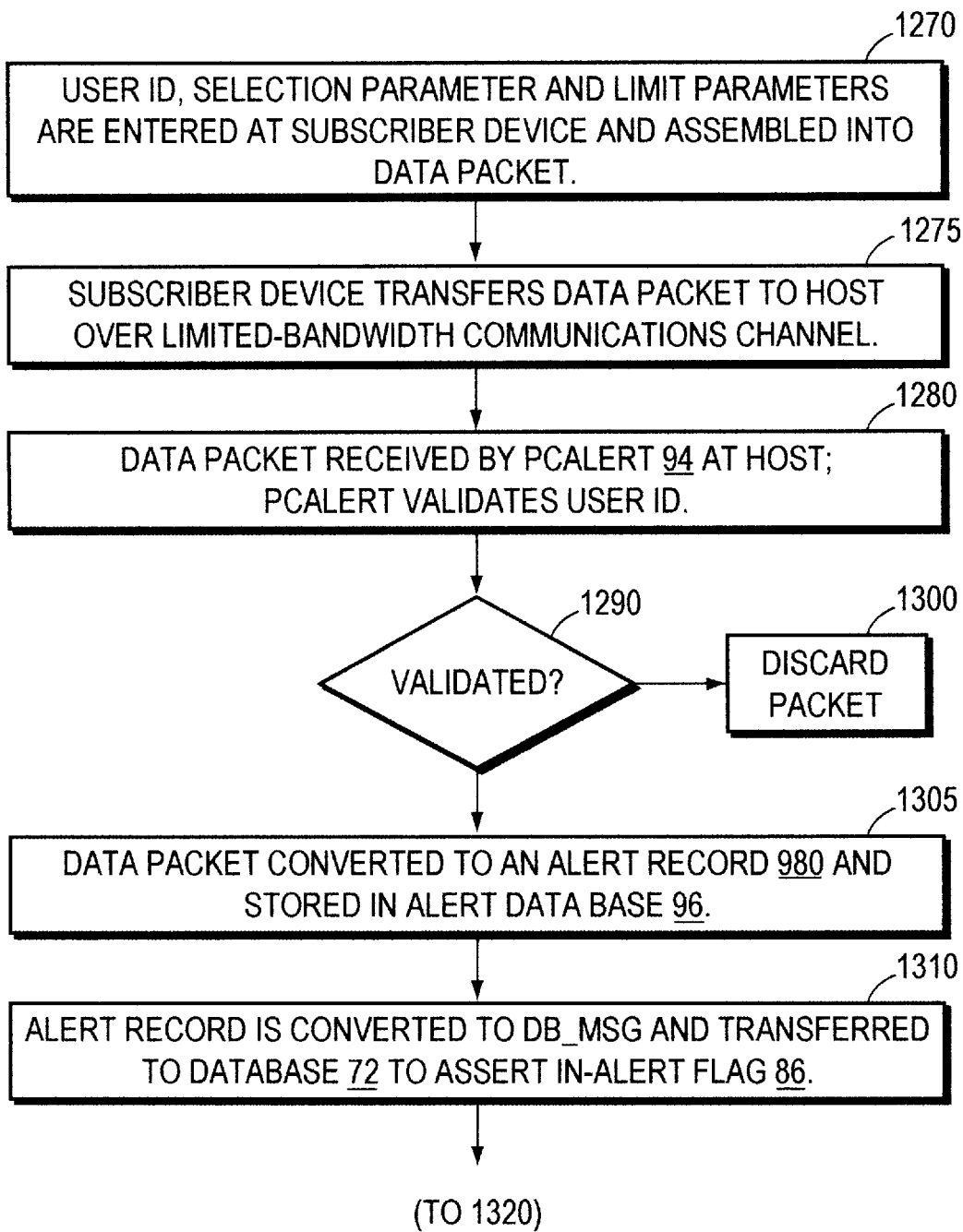
Figure 12C:
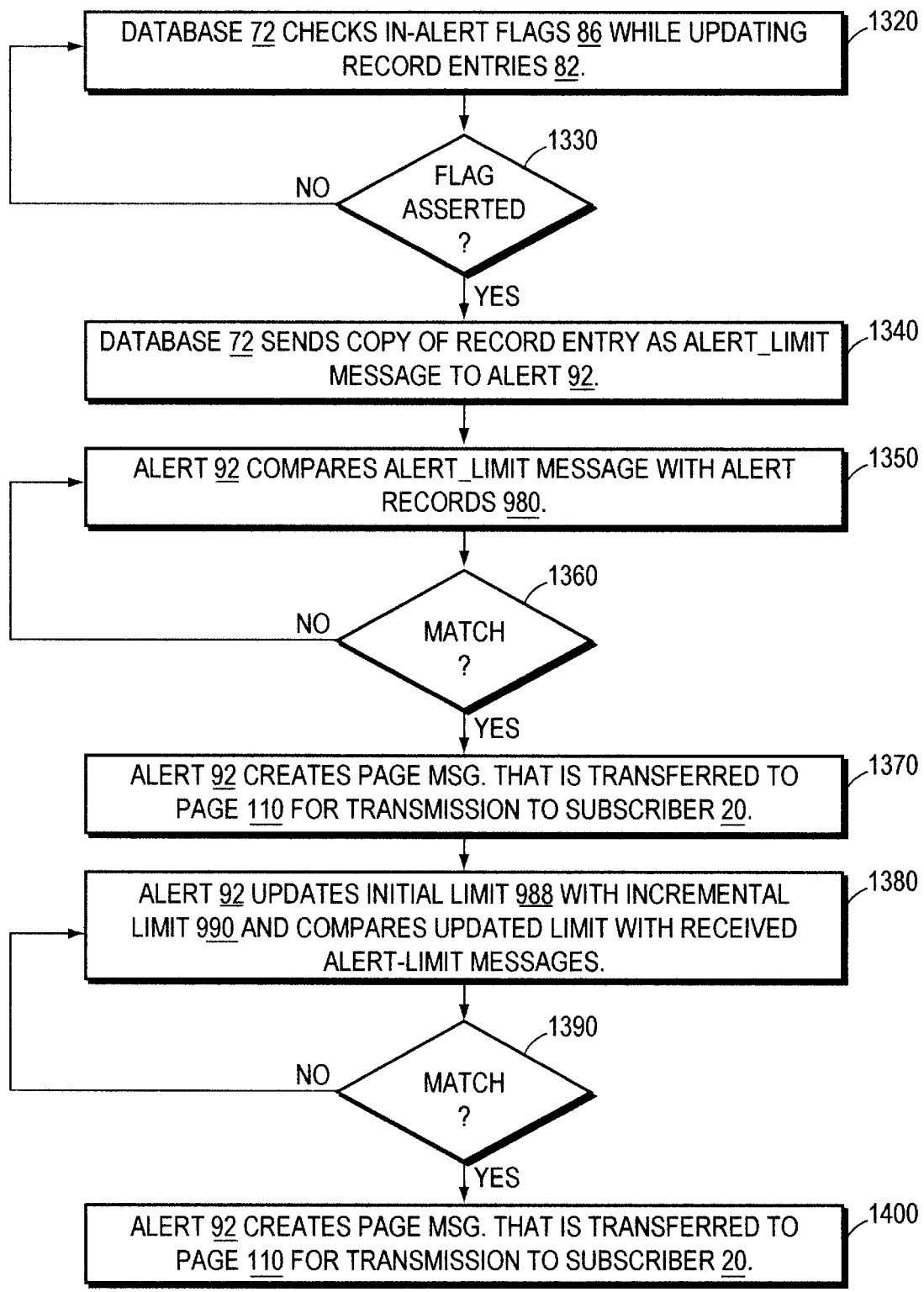

Operation of the information distribution system 10 will now be described in connection with the flowchart 1200 of FIGS. 12A–12C. The system includes at least one subscriber coupled to a host computer that is configured to collect information from the sources.

At initialization, the DATABASE 72 process spawns the other processes in the DBASE 70 and LIMIT 90 subsystems, fetches groups of the database information files from the storage devices 18 and loads these files into host memory 16. Concurrently, the PAGECTL 112 process spawns PAGESERV 114 processes to communicate with the paging services. (Step 1210.) The DATABASE 72 and PAGECTL 112 processes then scan their respective sockets, waiting for messages.

The KRFILT 74 process decodes streams of incoming information from the sources, converts them to message formats and transfers the messages to the DATABASE 72 process as DB_MSGs. (Step 1220.) Upon receiving the DB_MSG, the DATABASE 72 process parses the fields of the DB_MSG and updates the appropriate record entry as follows. The first two characters of the identifier field 720 contained in the DB_MSG are used to identify the correct data structure list 80 in the database 720. (Step 1230.) The DATABASE 72 process then compares the entire identifier field 720 of the DB_MSG with the name field 820 of the record entries 82. (Step 1240.) Preferably, the record entries 82 are stored alphabetically by symbol name. When a match (Step 1250) occurs, the contents of the value field 740 of the DB_MSG 700 are written to the current value field 822 of the record entry 82. (Step 1260.)

At a remote location in relation to the host computer, an authorized user may be interested in a particular stock from among all stocks exchanged on a particular market. Additionally, the user may be interested in a particular price of the selected stock and the rate of activity of that stock. Accordingly, the authorized user enters a user identification (ID) and a symbol of a stock issue, i.e., the selection parameter, together with a numerical price value and an adjustment value, i.e., initial and incremental limit parameters, into the subscriber device 20 in response to a menu display; these parameters are assembled into a data packet in accordance with the MESSAGE-FORMING 56 process of the REMOTE 50 software subsystem. (Step 1270.) The data packet is then transmitted to the host computer 12 at the initiative of the subscriber. Arrangement of the parameters to a data packet format is performed at the remote site; therefore, there is no need for a continuous, interactive communication exchange between the subscriber 20 and host 12. (Step 1275.) Upon reception, the host computer responds with an acknowledgement; failure to receive the acknowledgement within a predetermined time interval is an indication that the packet was not correctly received and that retransmission is required.

At the host computer 12, the data packet is received by a PCALERT 94 process associated with a modem receiver; at this time, the PCALERT 94 process validates the user ID. (Step 1280.) If the user ID is not validated (Step 1290), the packet is discarded. (Step 1300.) If the ID is validated, the packet is forwarded to the ALERT 92 process, where it is converted to an alert record 980 and stored in the alert record database 96. (Step 1305.) The record 980 is then converted to a DB_MSG 700 and transferred to the DATABASE 72 process. (Step 1310.) DATABASE 72 asserts the IN_ALERT flag 86 after indexing into the proper database list 80 as described above. (See Steps 1230–1250.)

Meanwhile, the DATABASE 72 process is constantly checking the IN_ALERT flag 86 of entries 82 while updating their records with incoming DB_MSGs. (Step 1320.) If a flag 86 is not asserted, DATABASE 72 resumes scanning the sockets for incoming messages and updating the appropriate records. (Step 1330.) However, if an IN_ALERT flag is asserted, DATABASE 72 sends a copy of the entire record as an ALERT_LIMIT message to the ALERT 92 process. (Step 1340.) There, the contents of the message are parsed and compared with the limits of the alert records 980. (Step 1350.) If a match (Step 1360) occurs, ALERT 92 creates a page 116 that includes a message specifying that the limit condition was met. The page 116 is transferred to the PAGE 110 subsystem and through to a paging service, where it is transmitted to the subscriber 20. (Step 1370.) Upon reception, the subscriber responds with an acknowledgement; again, failure to receive the acknowledgement within a predetermined time interval is an indication that the page was not correctly received and that corrective action, such as retransmission, is required.

The ALERT 92 process then updates the initial parameter 988 of its record 980 with the incremental limit 990 and this latter limit is compared to the contents of subsequently-received ALERT_LIMIT messages. (Step 1380.) When the incremented limit matches the updated value of the stock (Step 1390), the subscriber 20 is again notified in the manner described above. (Step 1400.)

While there has been shown and described an illustrative embodiment for selectively manipulating a financial database "filter" from a remote location in a non-interactive manner, it is to be understood that various other adaptations and modifications may be made within the spirit and scope of the invention. For example, the invention is applicable to a medical database application. For this embodiment, a hospital database may be the repository for supplying medical laboratory information about patients. The information may include lab test results or patient data that is periodically monitored, e.g., blood chemistry parameters. This information may be collected at the database and forwarded to the host computer for filtering in accordance with controlling parameters entered at the subscriber device by an authorized user, such as a doctor.

Here, the LIMIT (and DBASE) software of the host computer (and database) and the REMOTE software of the subscriber device operate in the manner described above. For patient data information, the doctor may be concerned about, e.g., the rate of change in the blood chemistry parameters. By entering, at the subscriber device, a selection parameter (specifying a blood chemistry value), an initial limit parameter (specifying a previous value of the blood chemistry) and an incremental limit value (specifying a percent change of the previous value), the information distribution system, operating as set forth herein, will notify the doctor when and if the desired change occurs.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for remotely setting limits on an information distribution system including a remote processing device for being connected to a host computer by a communications channel, said method comprising the steps of:

entering selection and limit parameters at the remote processing device;

verifying the selection and limit parameters at the remote processing device prior to establishing said communications channel;

if the selection and limit parameters are verified at the remote processing device, establishing said communications channel and transferring said selection and limit parameters from the remote processing device to the host computer by the communications channel;

storing said selection and limit parameters in a memory of the host computer;

transmitting inbound information directly from at least one information source, through a communications link, to said host computer, said information source being outside said host computer and said processing device;

extracting, only in said host computer, extracted information from said inbound information in response to said selection and limit parameters, said extracted information including only those portions of inbound information which satisfy said selection and limit parameters; and distributing a non-interactive paging message from the host computer to the remote processing device, said paging message including, of said inbound information transmitted to said host computer, only said extracted information.

2. The method of claim 1 further comprising the step of formating said selection and limit parameters at the processing device.

3. The method of claim 2 wherein the step of formating comprises the step of organizing said parameters into a data packet format.

4. The method of claim 1 wherein said step of transferring said selection and limit parameters comprises the step of transmitting over a wireless communications channel to the host computer.

5. Apparatus for remotely setting limits on an information distribution system including a host computer for being connected to a remote processing device by a communications network, said apparatus comprising:

means for entering selection and limit parameters at the remote processing device;

means for verifying the selection and limit parameters at the remote processing device prior to establishing a connection to said host computer via said network:

means for establishing said connection and transferring via said communications network said selection and limit parameters from the remote processing device to the host computer if the selection and limit parameters are verified at the remote processing device;

means, coupled to said transferring means, for storing said selection and limit parameters in a memory of the host computer;

means for transmitting inbound information directly from at least one information source, via a communications link, to said host computer, said information source being outside said host computer and said processing device;

means, located only in said host computer and coupled to said storing means and said transmitting means, for extracting selected portions of said inbound information in response to said selection and limit parameters, said selected portions including only those portions of said inbound information which satisfy said selection and limit parameters; and means, coupled to said extracting means, for distributing a non-interactive paging message from the host computer to the remote processing device, said paging message including, of said inbound information transmitted to said host computer, only said selected portions of said inbound information.

6. The apparatus of claim 5 further comprising means for formating said selection and limit parameters at the processing device.

7. The apparatus of claim 6 wherein said formating means comprises means for organizing said parameters into a data packet format.

8. The apparatus of claim 5 wherein said means for transferring said selection and limit parameters comprises a wireless transmitter.

9. A remote processing device which is for providing selection and limit parameters to a host computer over an RF communications link, and is for receiving from the host computer information satisfying selected parameters which exceed the limits transmitted to the host computer, the remote processing device comprising:

A. means for entering selection parameters, and for entering limit parameters indicative of threshold amounts for said selection parameters;

B. a transmitter, responsive to said selection and limit parameters from said means for entering, for transmitting said selection and limit parameters to the host computer if the selection and limit parameters are verified by the remote processing device; and C. an RF receiver for receiving extracted portions of information from the host computer in response to transmitting said selection and limit parameters to the host computer, said extracted portions being extracted only by said host computer from source information transmitted from at least one information source directly to said host computer via wireless communication, said extracted portions including only those positions of said source information which satisfy said selection and limit parameters, said RF receiver receiving, of said source information, only said extracted portions from said host computer.

10. The remote processing device of claim 9 further comprising:

D. means responsive to s aid means for entering, for packing said selection and limit parameters into a format suitable for transmission over said transmitter.

11. The remote processing device of claim 9 wherein said means for entering includes a keyboard.

12. A method of providing selection and limit parameters to a host computer over a communications link, and receiving from the host computer information regarding selected parameters which exceed the limits transmitted to the host computer, the method comprising the steps of:

A. remotely entering selection parameters indicative of information for the host computer to monitor;

B. remotely entering limit parameters indicative of threshold amounts for said selection parameters;

C. remotely entering a user identification code;

D. transmitting from a remote location with a transmitter said selection and limit parameters and said user identification code to the host computer only if the selection and limit parameters are verified remotely from the host computer; and E. receiving, at said remote location, over a wireless communication link selected portions of information from the host computer in response to said selection and limit parameters, said selected portions of information being extracted solely by said host computer from source information transmitted to said host computer directly from at least one information source outside said host computer and said remote location via wireless communications, said remote location receiving, of said source information, only said selected portions from said host computer.

13. The method of claim 12 further comprising the step of

F. receiving an acknowledgment from the host computer over said wireless communications link in response to transmitting said selection and limit parameters.

14. The method of claim 13 further comprising the step of

G. forming a data packet containing said selection and limit parameters and said user identification code, along with a start of header code, and an error checking code.

15. The method of claim 12 wherein the step of entering limit parameters includes the step of B1. entering a high limit value and a low limit value.

16. The method of claim 12 wherein the step of entering limit parameters includes the step of entering an incremental limit value indicative of a rate of change of a corresponding selection parameter.

17. A method for remotely setting limits on an information distribution system including a remote processing device for being connected to a host computer by a communications channel, said method comprising the steps of:

A. entering selection and limit parameters at the remote processing device and verifying the selection and limit parameters at the remote processing device prior to establishing said channel;

B. transferring said selection and limit parameters from the remote processing device to the host computer via the communications channel, said channel being established only after said selection and limit parameters are verified by the remote processing device;

C. receiving at said host computer directly from at least one information source external to said host computer and remote processing device, via a communication link, inbound information;

D. extracting only at said host computer extracted information from said inbound information in response to said selection and limit parameters, said extracted information including only those portions of said inbound information which satisfy said selection and limit parameters; and E. transmitting a paging message from the host computer to the remote processing device, said paging message including, of said inbound information, only said extracted inbound information.

18. The method of claim 17 wherein said step of extracting inbound information includes the steps of D1. comparing said inbound information against said selection parameters to determine if any of said inbound information corresponds to any of said selection parameters;

D2. comparing to said limit parameters, said inbound information which corresponds to any of said selection parameters; and D3. extracting only of said inbound information parts thereof corresponding to said selection parameters which exceed said limit parameters, to create said extracted information.

19. Apparatus for remotely setting limits on an information distribution system including a host computer for being connected to a remote processing device by way of wireless communications, said apparatus comprising:

A. means for entering selection and limit parameters at the remote processing device;

B. means, responsive to said selection and limit parameters from said means for entering, for establishing the wireless communications and for transferring via said communications said selection and limit parameters from the remote processing device to the host computer only after verifying the selection and limit parameters at the remote processing device;

C. means for receiving inbound information directly from at least one information source via said communications, said information source being external to said host computer and processing device, and said receiving means also being for receiving said selection and limit parameters at the host computer;

D. means, located only at said host computer, for extracting only those portions of said inbound information that satisfy said selection and limit parameters; and E. means, coupled to said means for extracting, for transmitting a paging message from the host computer to the remote processing device, said paging message including, of said inbound information received by said host computer, only said extracted portions of said inbound information.

* * * * *